Oct. 24, 1939.  K. E. EVRELL  2,177,212
AUTOMATIC POWER TRANSMISSION DEVICE FOR AUTOMOBILES AND THE LIKE
Filed Nov. 4, 1935  5 Sheets-Sheet 1

K. E. Evrell
INVENTOR

By: Glascock Downing & Seebold
Attys.

Oct. 24, 1939. K. E. EVRELL 2,177,212
AUTOMATIC POWER TRANSMISSION DEVICE FOR AUTOMOBILES AND THE LIKE
Filed Nov. 4, 1935 5 Sheets-Sheet 3
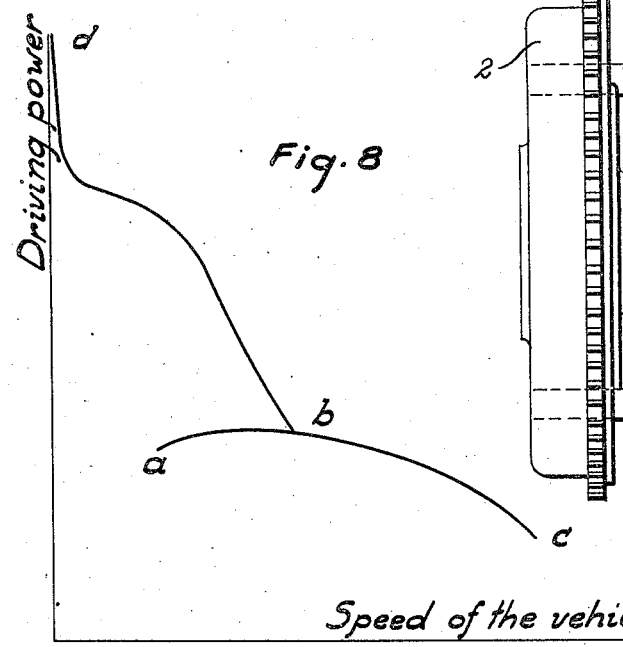
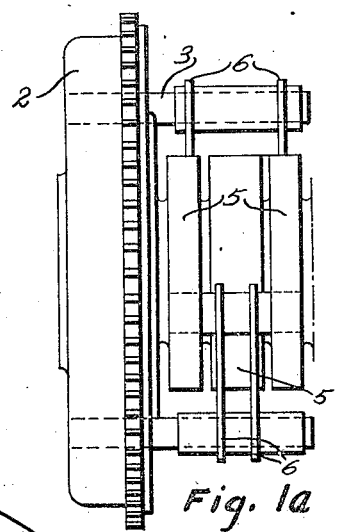
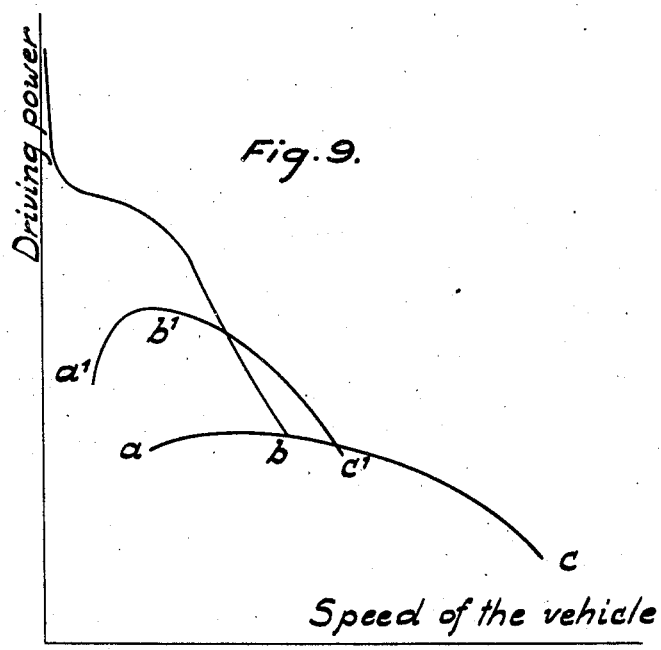

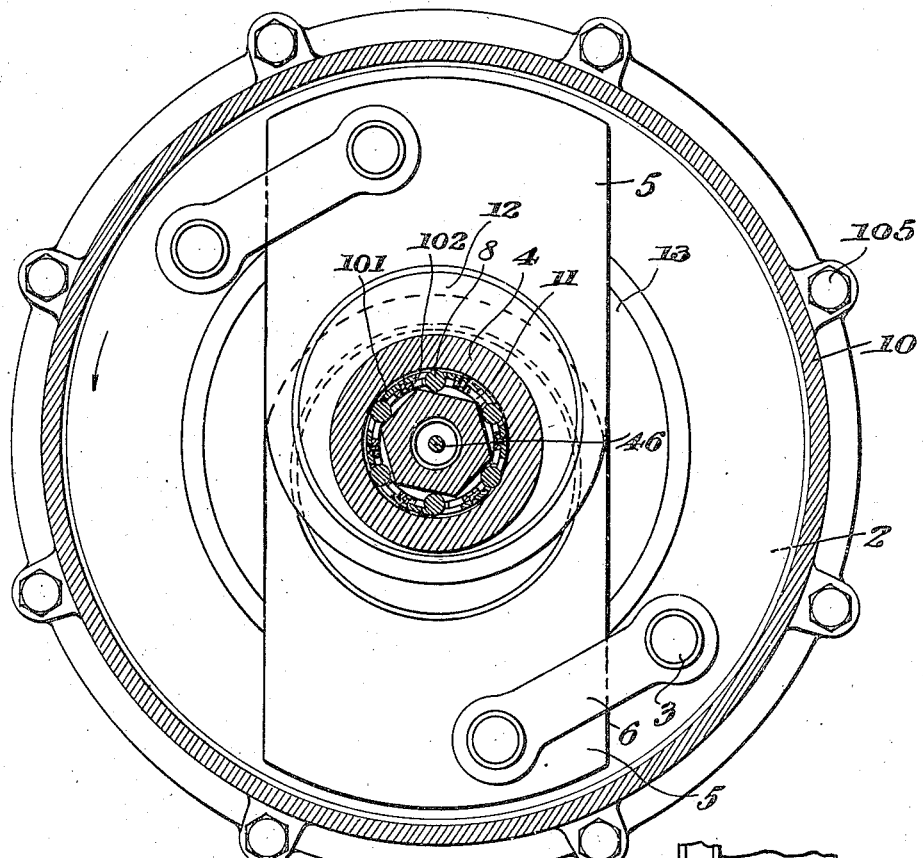

Oct. 24, 1939.  K. E. EVRELL  2,177,212
AUTOMATIC POWER TRANSMISSION DEVICE FOR AUTOMOBILES AND THE LIKE
Filed Nov. 4, 1935   5 Sheets-Sheet 5
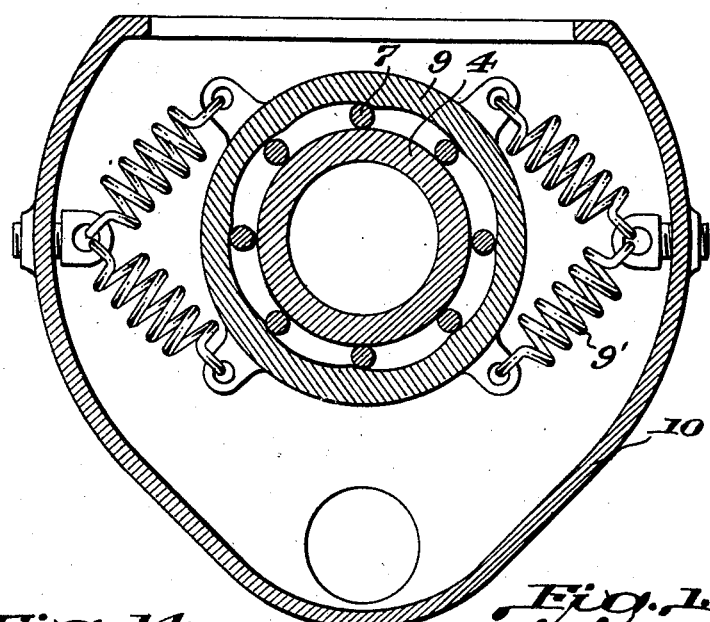
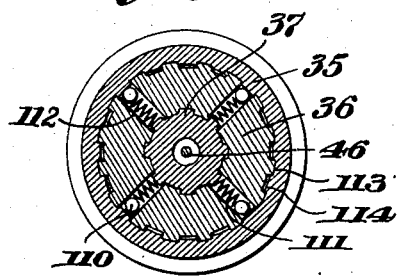
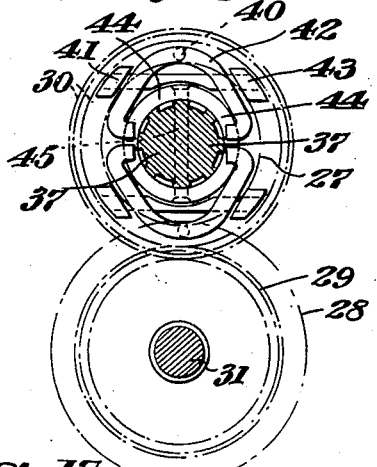
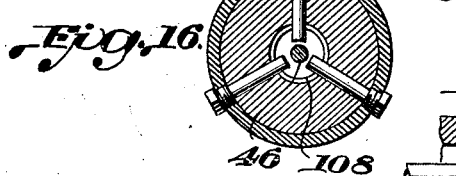
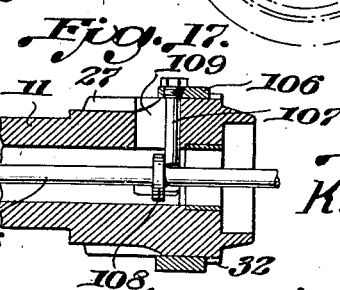
Inventor:
K. E. Evrell
By: Glascock Downing & Seebold
attys.

Patented Oct. 24, 1939

2,177,212

UNITED STATES PATENT OFFICE 2,177,212

AUTOMATIC POWER TRANSMISSION DEVICE FOR AUTOMOBILES AND THE LIKE

Kaleb Emil Evrell, Eskilstuna, Sweden

Application November 4, 1935, Serial No. 48,245
In Sweden November 8, 1934

2 Claims. (Cl. 192—3.5)

The present invention relates to transmission devices and more particularly pertains to automatic speed changing devices wherein the automatic operation may be manually controlled.

The advantage the fully automatic change speed gear device over the manually operated one is that the driver need not occupy himself with the operation of the device, but at the same time this property limits the operation capacity, as the automatic change speed gear is not equipped with and hardly can be equipped with organs of sense and thinking for observing and deciding what is to be done in each special case. Of course, the action of the fully automatic change speed gear device must give a result, which measures up with the average demands but which does not fulfill the requirements in extreme cases. A case of the last mentioned kind is driving on slippery roads, in which case a steady and suitably accommodated gear ratio between driving motor and car for known reasons makes the driving relatively free of risks as compared with driving in a car provided with a free wheel mechanism. Another case is driving down long slopes, in which case, according to experiences, satisfactory braking of the vehicle may be obtained only when the driving device is so arranged that the car may be forced to drive the motor with a sufficiently high number of revolutions.

The present invention has for its object to provide a change speed gear device, combining the advantages of the fully automatic device of this kind with those of the manually operated one, and it consists of an automatic gear device combined with a toothed speed gear, in which combination the driven shaft may be disconnected from the main shaft driven by the automatic gear. By this device the driven shaft of the automatic gear may either be connected directly to the driven shaft of the combined gear or it may be connected with the driven shaft via a toothed speed gear, the driving motor being in the latter case at the same time locked in the direction of rotation with the driven shaft of the automatic gear by means of a toothed or friction clutch or the like. The operation of the gearing may preferably take place with the same member as is used for reversing the automatic gear from forward to back. If such an operating member is used the same should preferably be arranged in such a manner that the driver may operate only the automatic gear or the speed gear, both arranged in series, but not both gears simultaneously.

The invention is illustrated in the accompanying drawings, in which

Figure 1a is an elevation view of the weights and pins driven by the flywheel and this view is taken in the direction of the arrows associated with the line Ia—Ia of Figure 1.

Figure 8 illustrates graphically the mode of action of an automatic change speed gear of the type included in the shown embodiment, without combination with the speed gear, mentioned above.

Figure 9 shows the mode of action after connection of the speed gear to the automatic gear.

Figure 10 is a section on line 10—10 of Figure 1 looking in the direction of the arrows.

Figure 11 is a developed view of the rollers 8 and the holding devices therefor.

Figure 12 is a development of a portion of sleeve 17.

Figure 13 shows a resilient connection between the parts 9 and 10.

Figure 14 is a cross section of the parts 35 and 46 of the toothed gear showing the shape of the teeth and radial holes with balls and springs.

Figure 15 is an end view of the parts 40 to 45 operating the connection of the flywheel and the shaft 11.

Figures 16 and 17 show further features of this operating means.

Figure 1:
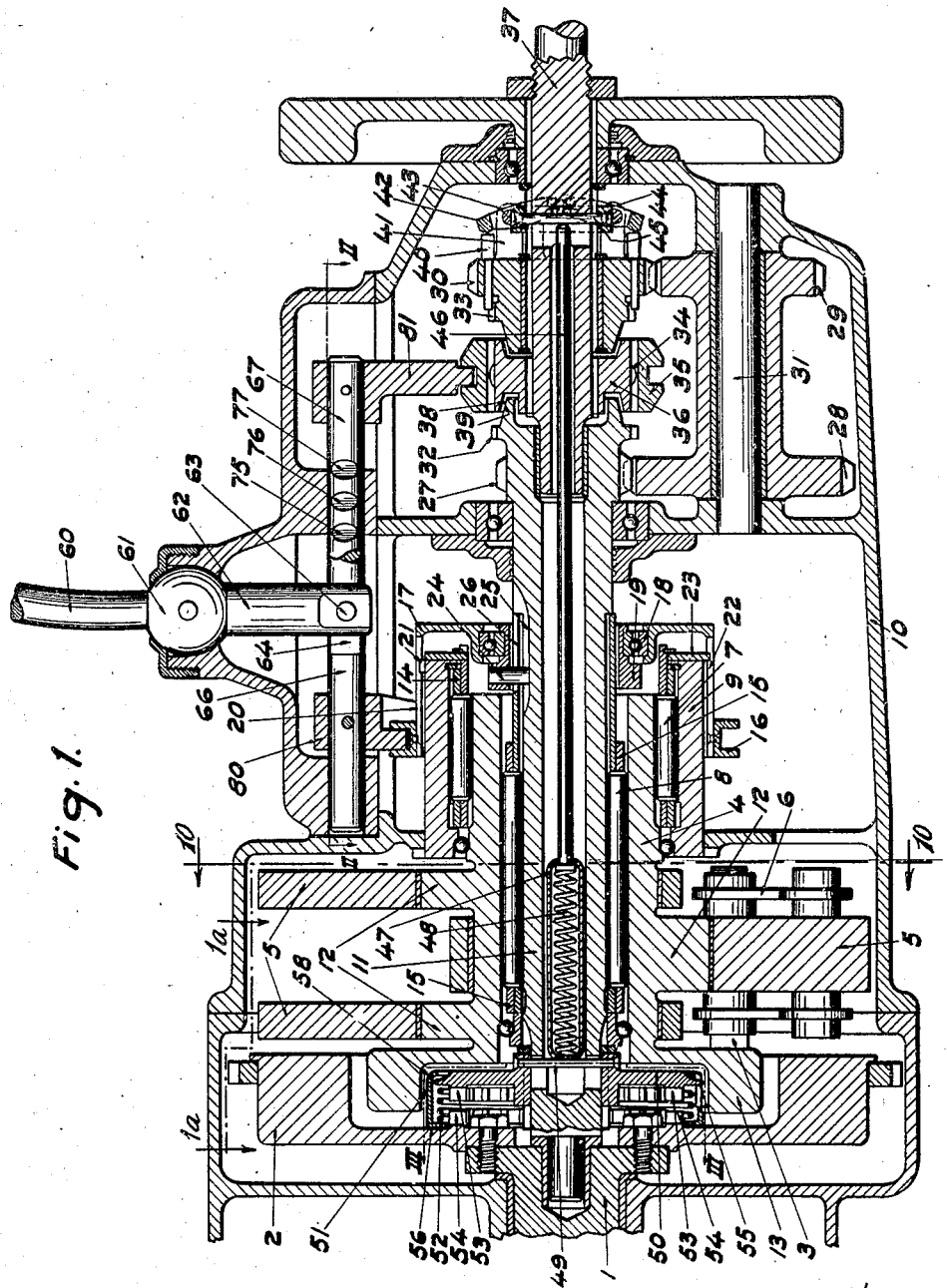
Figure 1 is a vertical longitudinal section of the combined gear device.

On the shaft 1 of the driving motor, for example of an automobile motor, there is secured a flywheel 2. From two pins 3 secured to the flywheel the centrifugal weights 5 are driven by means of links 6, the said weights being mounted on the blocking sleeve 4, which is cylindrical on its outside as well as on its inside. The weights 5 are positioned on eccentrics 12 provided on the circumference of the sleeve 4.

When the centrifugal weights rotate a torque varying between a positive and a negative maximum value is effected on the sleeve 4, and by means of series of blocking organs such as rollers 7 and 8, which series act in opposite directions of rotation, said torque is transmitted both to an outer blocking sleeve 9, which by means of a resilient connection device 9' shown in Fig. 13 is held fast on the housing 10, which is rigidly connected with the driving motor, as shown in Fig. 10 and to an inner blocking sleeve 11, which is mounted in the shaft 1 of the driving motor and at the same time forms the main shaft of the automatic gear.

When the eccentrically disposed centrifugal weights rotate during geared run they will approach and, respectively, withdraw from the sleeve 4. When they approach the sleeve they impart to it a torque or an impulse, in one direction, which is presupposed to rotate the sleeve in the direction of the arrow in Figure 10, or the direction of rotation of the driven shaft 37 and the sleeve 4, by means of the rollers 8, rotates the shaft 11 (see Figure 10). This torque or impulse generally is called a positive one, when, as in the present case, it has a direct driving action on the shaft. When the centrifugal weights withdraw from the sleeve 4 they actuate the same with a torque in the opposite direction, that is to say, they tend to pull the sleeve back. This movement, however, is prevented by the rollers 7 and the sleeve 9 secured in the housing 10, see Figure 13. From Figure 13 it will be seen how the rollers 7 can be pressed against the elevations in the sleeve 9 so that the torque is received by the latter. As the sleeve cannot rotate more than what is allowed by the elastic mounting, this so-called negative torque, the negative impulse, will be transmitted as an accelerating impulse to the wheel 2. By displacement of the roller holders 14 and 15 it is possible to move the rollers 7 and 8 peripherally to the opposite extreme position between the checking surfaces and thereby to shift the action of the rollers for backward run. The formerly negative torque or impulse will then become a positive one as it then has a direct driving action on the shaft 11 via the rollers 8. When displacing the holders 14 and 15 to a middle position, or to a position between the extreme positions, both sets of rollers 7, 8 run freely.

A flywheel mass 13, which is rigidly connected with the eccentrics 12 and the sleeve 4, serves to reduce the angular accelerations on the sleeve 4 to a value, which is suitable for the engagement of the blocking organs for instance rollers 7, 8 and to effect transmission of the gear. The reversing of the blocking rollers 7 and 8 takes place in a known manner by means of opposite rotatory motions of their respective holders 14 and 15. The said operation is effected by axial displacement of a grooved ring 16, a sleeve 17 rigidly united with the same and provided with a ball bearing 18, and by means of an inner ring 19. The sleeve 17 has a number of straight slots 20 for projections 21 provided on the stop sleeve 9, and a number of helical slots 22, for projections of the outer edge of a driving plate 23 rigidly connected with the roller holder 14, the plate thus turning the roller holder 14 at the axial movement of the sleeve 17. This will be clearly understood on reference to Figs. 1, 11 and 12. The turning of the inner roller holder 15 takes place in a similar manner by means of a number of pins 24 secured in the ring 19, which extend in straight grooves 25 of the inner blocking sleeve 11 as well as in helical grooves 26 of the roller holder 15. The rollers 7 and 8 may thus be moved to positions where they lock respectively the members 9 and 4, or the members 11 and 4 together in any direction of rotation or where one set or the other runs freely. Figure 13 shows how the inner surface of 9 is formed for this purpose. Rollers 8 operate in a similar way, see Figure 10.

The automatic part of the change speed gear device is separated from the toothed speed gear by means of a partition, which completely isolates the two parts from each other and which makes it possible to use the most suitable kind of lubricating oil for each part of the device.

The toothed speed gear (speed reducing gear) consists of two helical gears 27, 28 and 29, 30, which permanently mesh with each other. The wheel 27 is rigidly connected with the blocking sleeve 11. The wheels 28 and 29 may be made integrally with each other and mounted on a stationary bolt 31, the wheel 30 being loosely mounted on the driven shaft 37. The coupling member consists of two main parts 35 and 36, the part 36 of which slides axially freely on the shaft 37 but which is prevented from turning relatively to the same by means of keys or splines, not shown, fitting into grooves in the shaft and in the part 36 in known manner. The outer circumference of the part 36 is provided with teeth 113 which mesh with corresponding teeth 114 of the inner circumference of the part 35. The part 36 is provided with radial holes 112, in which balls 110 are pressed outwards by means of springs 111 against the rounded groove 34 in the inner circumference of the part 35. The balls being under spring pressure, cause the two parts 35 and 36 to move together when either of them is displaced in axial direction. A displacement of the part 35 relatively to the part 36 is not possible until the resistance caused by the spring pressure has been overcome. In ears 41, secured to the toothed wheel 30, balancing members 42 are pivoted on pivots 43. These balancing members engage pins 40 extending parallel to the shaft 37. A ring 44 is slidable on shaft 37 in the path of the balancing members 42. A peg 45, extends through a slot in the shaft and is secured to said ring 44. A pressure bar 46 extends along the axis of shaft 37 and sleeve 11 and presses against a coil spring 48 for a purpose hereinafter set forth.

When the coupling member 35 is displaced from the middle position shown in the drawings toward the driving motor the two conical surfaces 38 and 39 after a slight movement come into contact with each other and the conical surfaces are tightly pressed against each other. Thereupon in case the parts have not before been rotating at the same speed, they become synchronized very easily, if there is no positive obstacle preventing synchronizing, and some of the parts have a sufficiently small mass. Both these conditions are filled in this case. The moment of inertia of the mass represented by the blocking sleeve 11 and the four toothed wheels 27, 28, 29, 30, is relatively small in relation to the rather great moment of inertia, which in the which in the ordinary automobile gear is represented by the clutch with its large diameter.

After this synchronizing has taken place the blocking sleeve 11, the toothed wheel 27 with its additional toothed rim 32, the parts 35 and 36 and the driven shaft 37 thus rotate at the same speed, and the part 35 may easily be displaced in such a manner that its inner teeth will mesh with the toothed rim 32, when the blocking sleeve 11 of the automatic gear is rigidly coupled with the driven shaft 37. If, however, the part 35 is moved in the opposite direction synchronizing and coupling of the toothed wheel 30 and the shaft 37 will take place in identically the same manner, but during the last part of the movement of the coupling member 35 the same by means of pins 40 will act on balancing members 42, which turn on pivots 43 in ears 41 secured to the toothed wheel 30 and thereby displace the ring 44 in direction towards the driving motor. The motion of the ring 44 is transmitted by means of the peg 45 to the pressure bar 46, which sets a coil spring 48 fixed in the sleeve 47.

The sleeve 47 rests against a peg 49 of a coupling member 50, which is axially displaceable on the fore end of the blocking sleeve 11, which is provided with grooves for the said member. The coupling member 50 is provided with teeth 53, which may be brought into engagement with corresponding teeth 54 on the flywheel 2 of the driving motor, and is also provided with projections 55. A ring 51, surrounds the coupling member 50, and has an inturned flange 56, having a sliding surface in contact with the flywheel 2. A coil spring 52 bears against the inturned flange pressing it against the flywheel 2 and the other end bears against the coupling member 50. T-shaped recesses 57 are provided in the ring 51 and the projections 55 lie therein. Synchronization is thus secured. When no axial pressure is exerted on the peg 49 by the sleeve 47 the projections 55 are free both of the recesses 57 and of a bent portion 58 of the ring 51, the bent portion having been provided for mounting reasons. Because of the fact that the coupling member 50 always rotates with the sleeve 11, and the ring 51 by its frictional engagement with the flywheel 2 tends to rotate at the same speed as the driving motor, the projections 55 will rest either against one side or the other of the broader portion of the recess 57 owing to the motor rotating faster (gear run) or more slowly than the sleeve 11. The changing of the resting from the various sides takes place just immediately after synchronism between the motor and the sleeve 11 has been reached and at the changing the projections 55 have the possibility of falling into the deeper and narrower part of the recesses 57. Then the teeth 53 and 54 come into engagement with each other.

Figures 4, 5, 6:
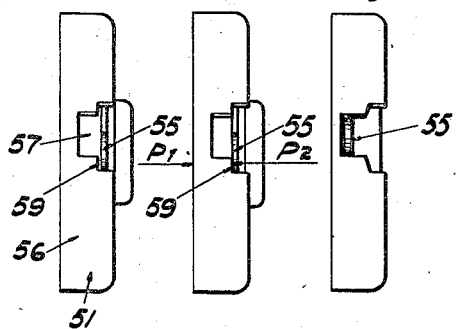
Figures 4, 5 and 6 show side views in various positions of function of the same details embodied in Figure 3.

At the previous mentioned pressing together of the spring 48 the teeth 53 and 54, therefore, are generally prevented from engaging each other, because the projections 55 are stopped against the surfaces 59 in the manner shown in Figure 5. On the first moment that the speed of the driving motor becomes the same as that of the sleeve 11, coupling together will thus be effected (Figure 6). Consequently, after that the driving motor is rigidly connected with the toothed wheel 27, which via the intermediate wheels 28, 29 drives the toothed wheel 30, which is now coupled with the driven shaft 37.

Thus, the driving motor runs with another number of revolutions than the shaft 37, but no other free wheel element existing between them this position may be used both for braking the motor and for driving the car. The safety device 55 and 51 ensures that there will be no risk of connection which may give impulsive forces on the teeth 53 and 54. The purpose of the spring 52 is to give the frictional engagement required on the surface 56 in order that the safety device shall act, and to move the tooth clutch 53, 54 out of engagement, when the wheel 27 is directly coupled with the shaft 37. With reference to the characters in Figure 5, $P_1$=the elastic force of the spring 52 and $p_2$=the elastic force of the spring 48 and $\mu_1$=coefficient of friction between the contacting surfaces at 56 and $\mu_2$=coefficient of friction between the members 55 and 59. In order that sliding off and engaging shall take place at the synchronizing $P_1 \times \mu_1$ should be greater than $(P_1-P_2) \times \mu_2$. This condition may be fulfilled by suitably accommodating the spring forces. For facilitating the movement of member 55 over surface 59 into coupling position, the surfaces may be slightly bevelled as shown on an exaggerated scale in Figure 6.

In order that the tooth coupling 53, 54 shall more easily enter into engagement the same may be arranged with only half of teeth in one set of teeth and with each second tooth of the other set of teeth somewhat shorter.

Figure 2:
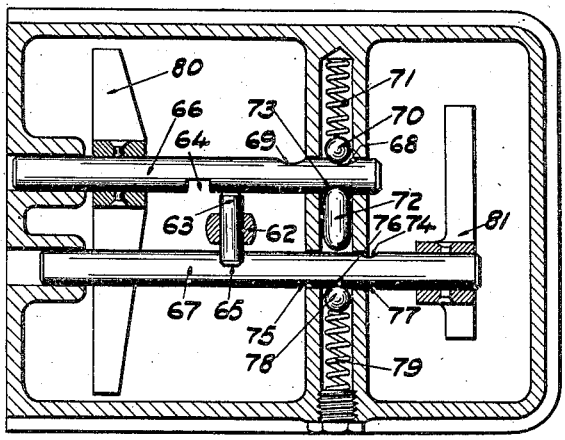
Figure 2 is a horizontal section taken in the direction of the arrows associated with the line II—II of Fig. 1.
Figure 3:
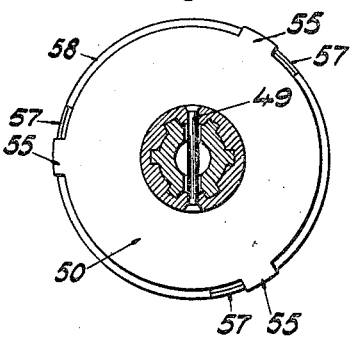
Figure 3 is a section III—III of Figure 1 which section shows a device for synchronizing two coupling elements before engagement between them.

The operation of the transmission device takes place by means of the reversing lever 60, 62, which is journaled in the ball joint 61 and the lower end of which has a transverse peg 63, capable of engaging the recesses 64 and 65 in the operating shafts 66 and 67 (Fig. 2). The shaft 66 is adapted to be used for reversing the automatic gear. The same may either be set for forward movement as is shown in Figures 1 and 2, or for backward movement, in which case the index ball 70, which is under the pressure of the spring 71, locks the shaft 66 by engaging the recess 69. The recesses 68 and 69 are intentionally made somewhat large for the ball 70 to easily admit of an extra manual action on the operating members of the automatic gear. Such extra action may be desirable when starting with cold oil, because the blocking rollers, in order not to slide, then require a considerably greater straining. The motion from the operating shaft 66 to the above described grooved ring 16 takes place by means of the coupling fork 80 secured to the shaft.

The operating shaft 67, which by means of a coupling fork 81 acts upon the above described coupling member 35 serves to reverse the toothed gear and has three positions marked by the indexes 75, 76 and 77. The ball 78 pressed by the spring 79 has for its object to lock the shaft 67 in the desired position. The shown position 76 determined by the ball 78, is the free motion position and in this position the driven shaft 37 is disconnected from the shaft or sleeve 11. Index 77 corresponds to direct coupling and 75 to reduced speed gearing between the shafts 11 and 37. The movable safety plug 72, guided between the shafts 66 and 67, and the corresponding recesses 73 and 74 in the shafts prevent all simultaneous movements of the shafts. The automatic gear device must be shifted to forward motion (the position of the shaft 66 shown in Figure 2), the safety plug 72 then falls into the recess 73, in order to enable the shaft 67 to move. For shifting to backward motion the shaft 67 must be located at index 77. When the automatic gear is shifted for forward motion and the toothed speed gear is set for direct driving but is out of operation the recesses 64 and 65 are opposite each other, and the reversing lever may be moved sideways as much as the depth of the grooves allows.

Figure 7:
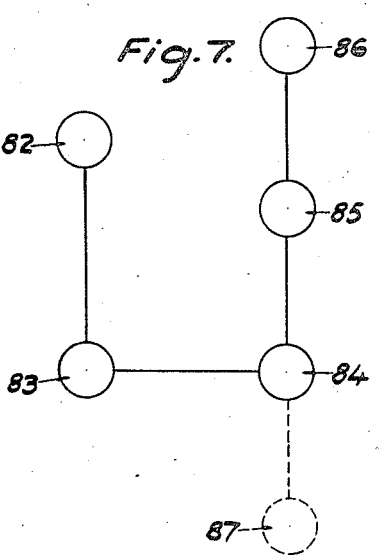
Figure 7 shows the various positions, which the upper end of the reversing hand lever may assume, and the tracks along which the same may be moved during the operations.

Figure 7 shows the various positions, which the upper end of the reversing lever may assume. 82 indicates the position of the lever during backward movement. In that case the automatic gear is set on backward motion and the toothed speed gear is directly coupled. 83, 84 and positions between these positions are the normal ones for forward driving. If not very long slopes necessitate braking by means of the motor one may let the lever remain in this position during all forward driving. 85 indicates the middle position, in which the motor runs freely. Said position is used when adjustment of the driving motor is necessary and on other occasions, when it is desired to completely disconnect the driving motor. 86 indicates the lever position, in which the driving motor works via a reducing gear. Still one other lever position 87, shown in dash-and-dot lines, may be used, if it is desired to prevent overrunning during direct run driving. If the device is equipped with this possibility provision therefor may preferably be made in such a manner that the coupling ring 35, after having been coupled together with the toothed rim 32, is caused to be further displaced in the same direction and then actuate a member, which strains the spring 48 and brings the tooth clutch 53, 54 into engagement.

This is shown in Figures 16 and 17. During the continued movement of the member 35 the member 46 is actuated by means of the ring 106 and the pins 107.

In Figure 8, which graphically shows the driving power at various speeds of the car, the curve $abc$ indicates the maximum driving power, which the motor, when directly connected to the car shaft, is able to give to the vehicle, and the curve $ab$ is the maximum driving power, which may be obtained at gear run in a well dimensioned automatic gear of the type included in the embodiment shown as an example. After the car has reached such a speed that the motor and the drive shaft have synchronized (direct run), the transmission cannot be caused to work on gear until after the speed is reduced to the point $a$.

Figure 9 shows the same curves for a vehicle, equipped with a speed reducing gear according to this invention. In addition hereto there is another driving power curve $a^1, b^1, c^1$, which may be obtained by moving the control lever to the position indicated by 86 in Figure 7 and by then increasing the number of revolutions of the motor. If $k$ is a figure indicating the proportion between the number of revolutions of the shaft 11 (the inner blocking sleeve) and of the driven shaft 37, when the speed reducing gear is connected, then each point on the curve $abc$ corresponds for example, $a$ to point $a_1$ on the new curve, which is so located that the speed at the point $a_1$ is equal to the speed at the point $a$ divided by $k$, and the driving power at the point $a_1$ is equal to the driving power at point $a$ multiplied by $k$. The product of driving power and the speed per second, or the mechanical effect is the same at the points $a$ and $a_1$. The advantage of always having a supply of increase of driving power within reach at all medium speeds of the vehicle is very valuable and might be of special use when overtaking other drivers and when climbing steep slopes.

Having now described my invention, what I claim as new and desire to secure by Letters Patent is:

1. In a transmission device for automobiles a driving shaft, a driven shaft and a main shaft therebetween, automatically regulated means connecting said driving shaft to said main shaft, means for directly coupling said main shaft to said driving shaft, a speed reducing gearing permanently connected with said main shaft and means for connecting said speed reducing gearing to the driven shaft or directly connecting said main shaft to the driven shaft, instrumentalities whereby said means may be held in a neutral position and in which the means for connecting the reducing gearing to the main shaft actuates the means for directly coupling said main shaft to said driving shaft.

2. In a transmission device for automobiles a driving shaft, a driven shaft and a main shaft therebetween, automatically regulated means connecting said driving shaft to said main shaft, means for directly coupling said main shaft to said driving shaft, a speed reducing gearing permanently connected with said main shaft and means for connecting said speed reducing gearing to the driven shaft or directly connecting said main shaft to the driven shaft, instrumentalities whereby said means may be held in a neutral position and in which a flywheel is secured to the driving shaft and the means for directly coupling said driving shaft and said main shaft comprises a toothed coupling, one coupling member of which is located on the said main shaft and the other on said flywheel of the driving shaft.

KALEB EMIL EVRELL.